United States Patent
Hartman et al.

[11] Patent Number: 6,038,889
[45] Date of Patent: Mar. 21, 2000

[54] COOLING SYSTEM FOR A GLASSWARE MACHINE

[75] Inventors: Terry E. Hartman, Northwood, Ohio; Herbert C. Kroh, LaSalle; David E. Crots, Ottawa Lake, both of Mich.

[73] Assignee: Libbey Glass Inc., Toledo, Ohio

[21] Appl. No.: 09/291,747

[22] Filed: Apr. 14, 1999

[51] Int. Cl.[7] .................................................. C03B 11/12
[52] U.S. Cl. .............................. 65/319; 65/265; 65/267; 65/355; 65/356; 425/526; 425/552; 249/79; 249/81
[58] Field of Search .............................. 65/319, 265, 267, 65/355, 356; 425/526, 552; 249/79, 81

[56] References Cited

U.S. PATENT DOCUMENTS

| | | | |
|---|---|---|---|
| 1,671,819 | 5/1928 | Evans | 65/356 |
| 1,864,689 | 6/1932 | Freese et al. | |
| 2,225,898 | 12/1940 | Benoit et al. | |
| 2,811,815 | 11/1957 | Eldred | |
| 3,149,951 | 9/1964 | Mennitt et al. | |
| 3,268,322 | 8/1966 | Denman | |
| 3,529,948 | 9/1970 | Eldred et al. | |
| 3,867,123 | 2/1975 | Hamilton | |
| 4,070,174 | 1/1978 | Nebelung et al. | |
| 4,134,748 | 1/1979 | Hileman | |
| 4,225,331 | 9/1980 | Bittner et al. | |
| 4,251,253 | 2/1981 | Becker et al. | 65/267 |
| 4,276,075 | 6/1981 | Olivotto | |
| 4,623,374 | 11/1986 | Doud et al. | 65/319 |
| 4,783,212 | 11/1988 | Loffler | 65/265 |
| 4,810,278 | 3/1989 | Braithwaite | |
| 5,059,236 | 10/1991 | Ito | |
| 5,215,566 | 6/1993 | Yamamoto et al. | |
| 5,304,229 | 4/1994 | Swanfeld | |
| 5,306,325 | 4/1994 | Smith et al. | |
| 5,545,366 | 8/1996 | Lust et al. | 425/552 |
| 5,851,257 | 12/1998 | Kroh et al. | |

OTHER PUBLICATIONS

Catalog pages entitled "Lynch Barrel Cam Press", published by Lynch Machinery–Miller Hydro, Inc. of Bainbridge, Georgia, Undated.

Catalog pages entitled "Lynch Motor Driven Press", published by Lynch Machinery–Miller Hydro, Inc. of Bainbridge, Georgia, Undated.

*Primary Examiner*—Peter Chin
*Assistant Examiner*—Michael P. Colaianni
*Attorney, Agent, or Firm*—Emch, Schaffer, Schaub & Porcello Co., L.P.A.

[57] ABSTRACT

A cooling system for use with a glassware machine having a plunger, a mold and a valve. The system includes a supply of cooling fluid such as air. The system further includes devices for cooling the plunger, the mold and the valve that are in communication with the supply of fluid.

10 Claims, 5 Drawing Sheets

COOLING SYSTEM FOR A GLASSWARE MACHINE

BACKGROUND OF THE INVENTION

The present invention relates generally to a cooling system for a glassware machine. More specifically, the invention is directed to a system for cooling a plunger, a mold and a valve of a glassware machine with a fluid such as air.

The plunger, the mold and the valve of a glassware machine must be cooled during operation in order to prevent the manufacture of defective glassware. It has been found that prior cooling systems are inefficient. Accordingly, there is a need for an improved cooling system for a glassware machine. The present invention satisfies this need.

SUMMARY OF THE INVENTION

The present invention is directed to a cooling system for a glassware machine having a plunger, a mold and a valve. The system includes a supply of fluid such as air. The system includes devices to permit flow of fluid from the supply of fluid to the plunger, the mold and the valve.

It is the primary object of the present invention to provide an efficient cooling system for a glassware machine.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
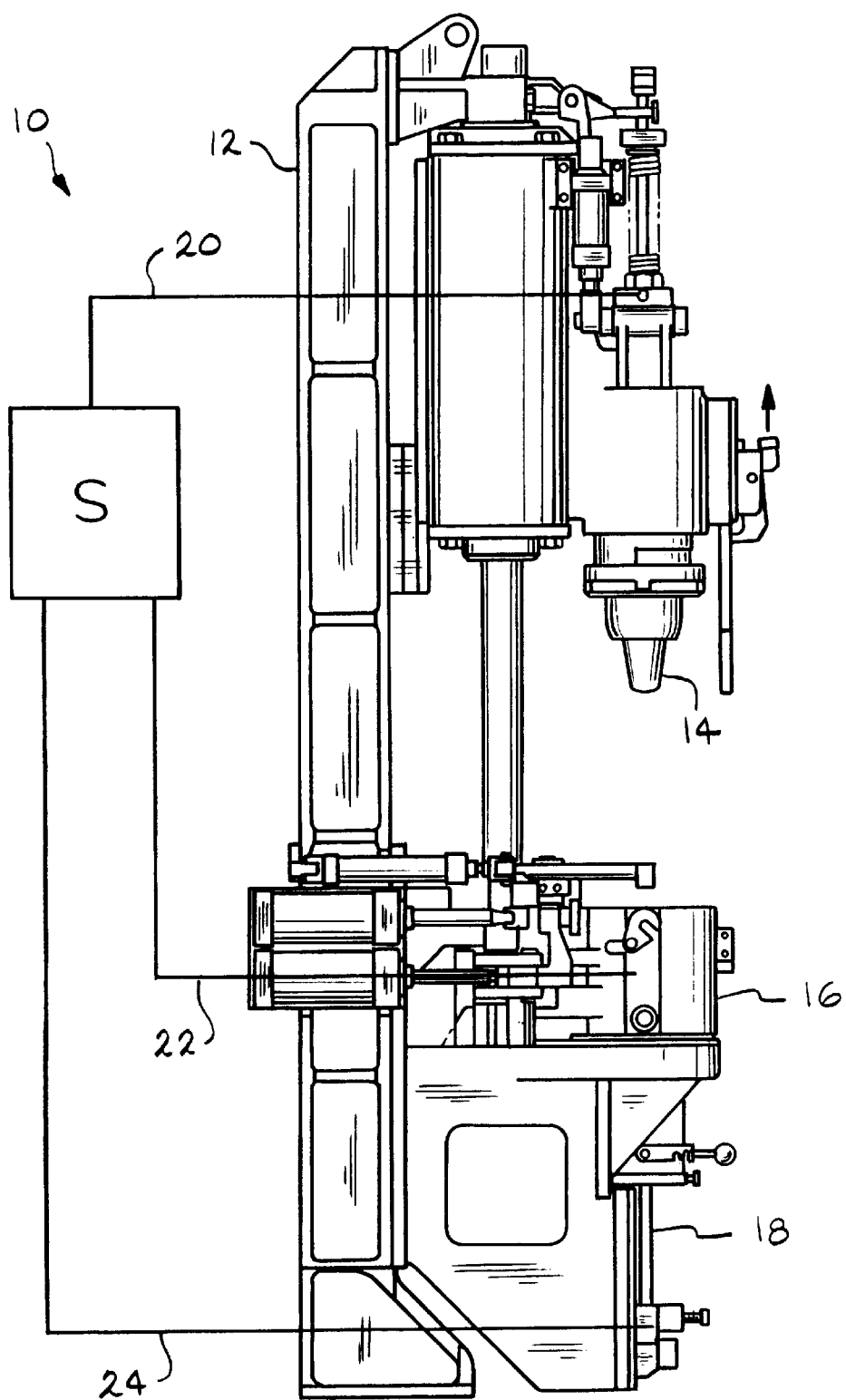
FIG. 1 is a side elevational view of a glassware machine including a cooling system according to the present invention.
Figure 2:
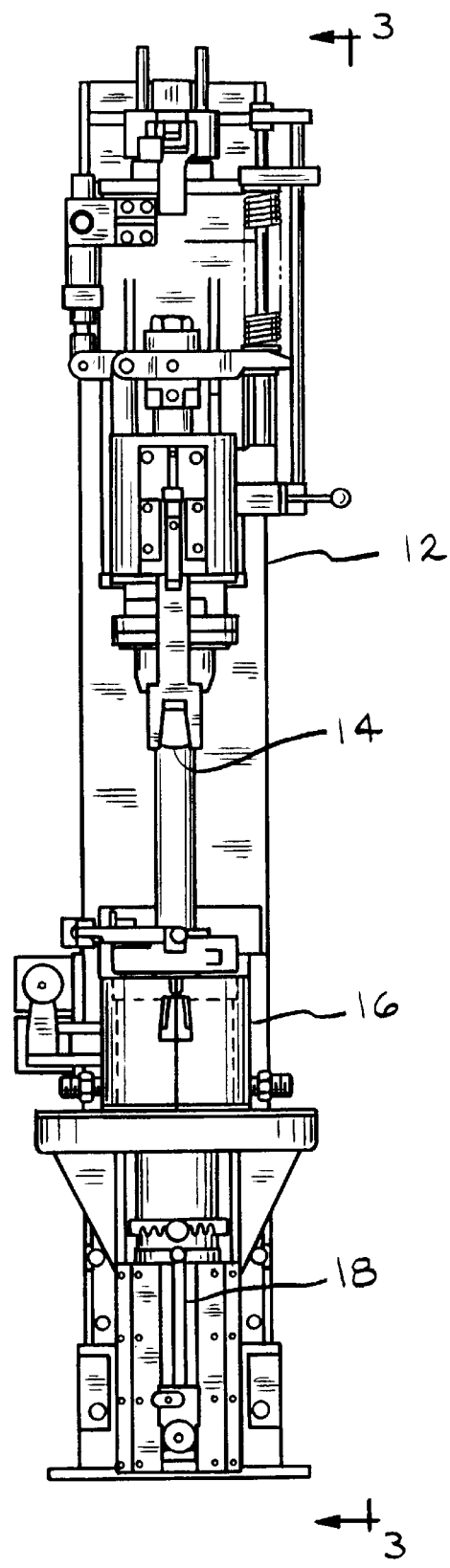
FIG. 2 is a front elevational view of the glassware machine shown in FIG. 1.
Figure 3:
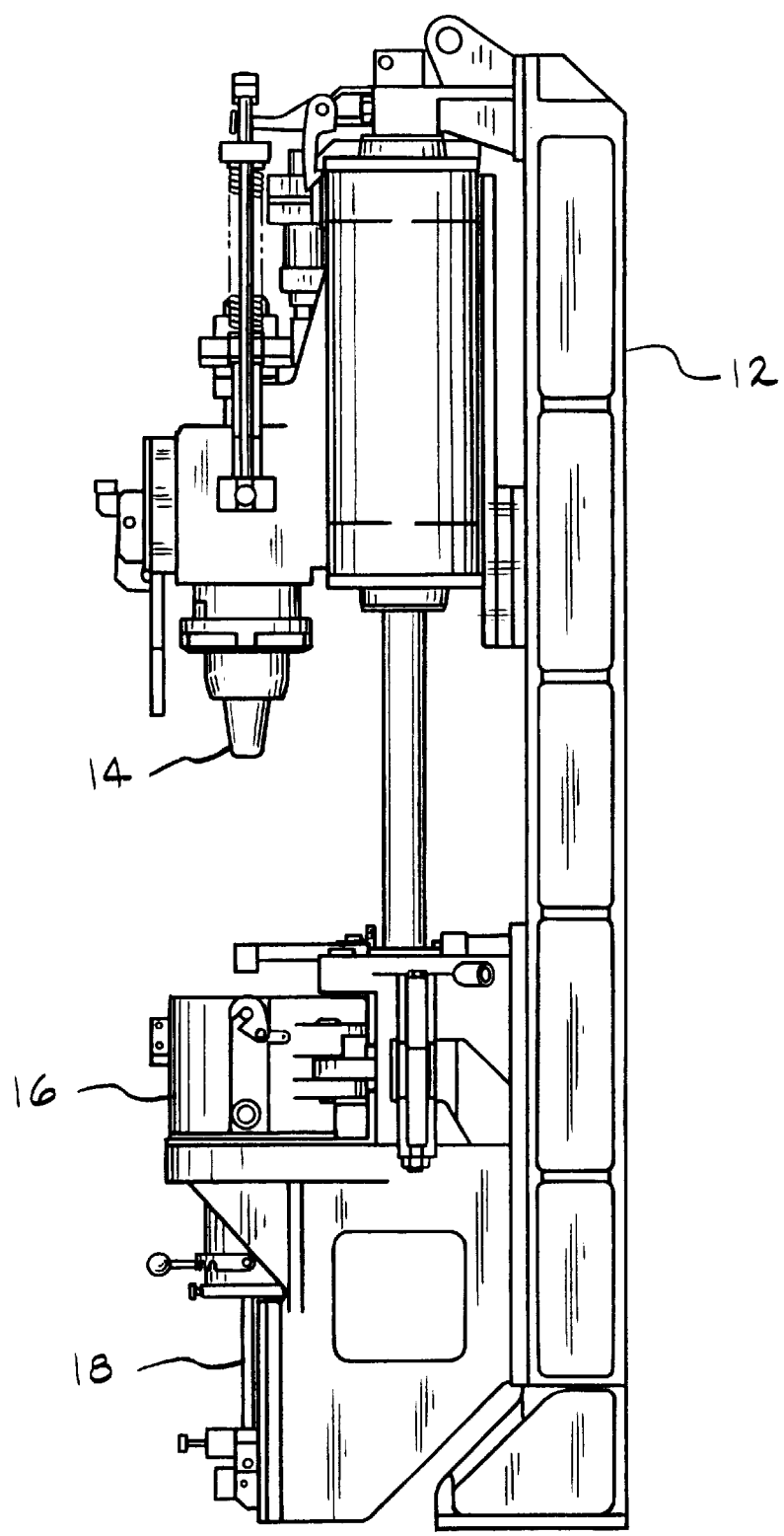
FIG. 3 is a view taken along 3—3 of FIG. 2.

The preferred embodiments and best mode of the present invention will now be described in detail with reference being made to the drawings. The cooling system of the present invention is indicated generally in the drawings by the reference number "10".

Referring to FIGS. 1–4A, the system 10 is incorporated into a glassware machine 12 having a plunger 14, a mold 16 and a valve 18. As shown schematically in FIG. 1, the system 10 includes a supply of fluid S. In a preferred embodiment, the supply of fluid S is a conventional tank containing compressed air. Still referring to FIG. 1, the supply of fluid S is in fluid communication with the plunger 14, the mold 16 and the valve 18 through lines or conduits 20, 22 and 24, respectively.

Figure 4:
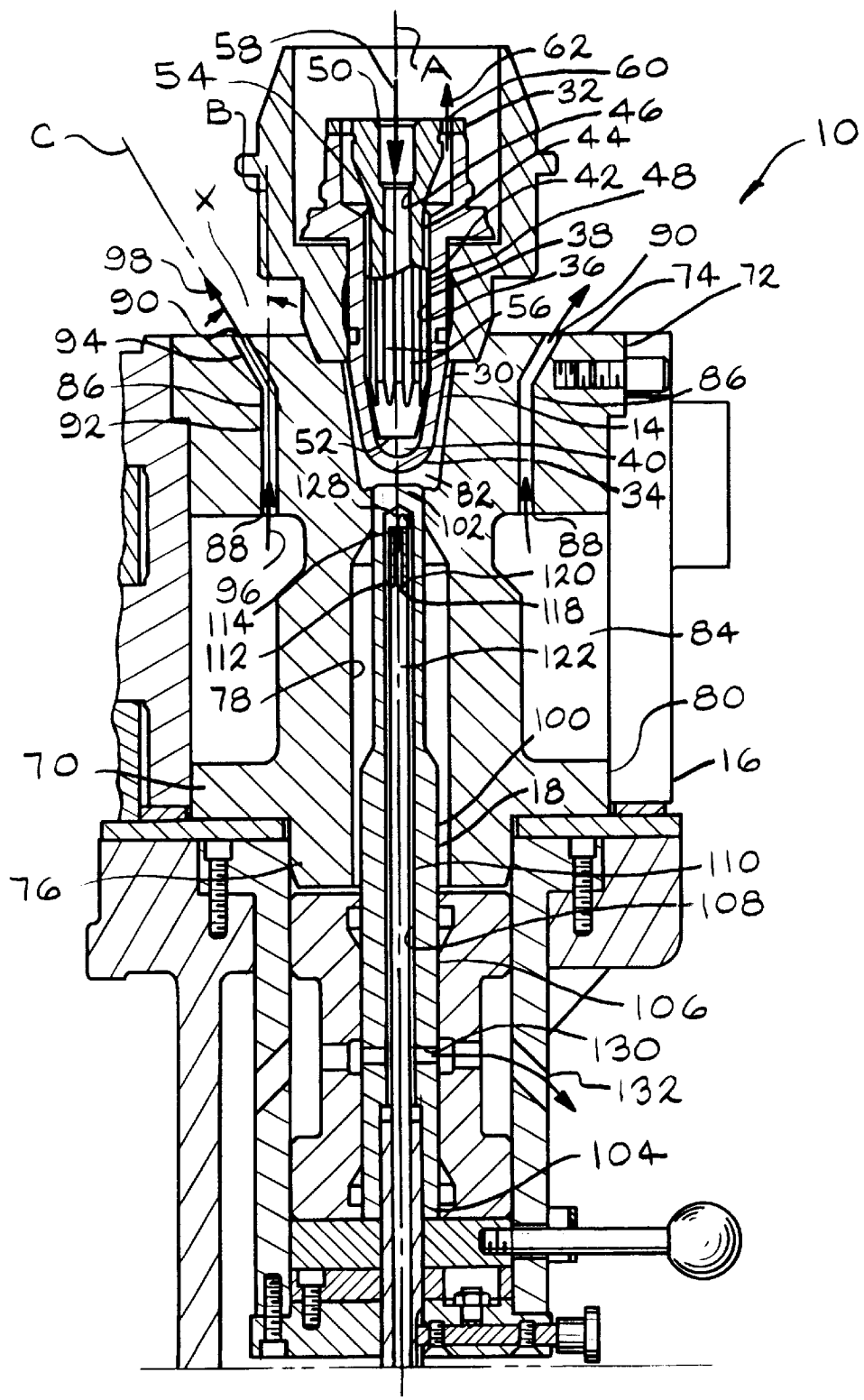
FIG. 4 is a cross-sectional view taken through the center of a plunger, a mold and a valve of the glassware machine shown in FIG. 1.

Referring to FIG. 4, the plunger 14 includes a cylindrical casing 30 extending radially about a first longitudinal axis A. The casing 30 includes an open end 32 and an opposed closed end 34. The casing 30 includes an inside surface 36 and an outside surface 38 extending between the open and closed ends 32 and 34. The inside surface 36 forms an elongated hollow recess or chamber 40.

Still referring to FIG. 4, the system 10 includes a plunger cooling tube 42 positioned in the chamber 40. The plunger cooling tube 42 includes a cylindrical wall 44 that extends radially about the longitudinal axis A. The wall 44 includes an interior surface 46 and an exterior surface 48. The exterior surface 48 is positioned adjacent to the inside surface 36 of the casing 30. The plunger cooling tube 42 includes an entrance end 50 positioned adjacent to the open end 32 of the casing 30 and an exit end 52 positioned adjacent to the closed end 34 of the casing 30. The supply of fluid S is in fluid communication with the entrance end 50 through fluid line 20 as shown in FIG. 1. The interior surface 46 forms a continuous fluid passage 54 that extends between the entrance end 50 and the exit end 52.

As shown in FIG. 4, the exterior surface 48 of the plunger cooling tube 42 defines a plurality of elongated longitudinally extending grooves 56. The grooves 56 extend radially about the first longitudinal axis A.

When the glassware machine 12 is in operation, a fluid such as air from the supply of fluid S enters the entrance end 50 of the plunger cooling tube 42 in the direction indicated by arrow 58 in FIG. 4. The fluid flows through the fluid passage 54 and is discharged through the exit end 52 adjacent to the closed end 34 of the casing 30. The fluid then travels upwardly through the grooves 56 toward the open end 32 of the casing 30. The fluid is discharged through an opening 60 in the direction indicated by arrow 62 in FIG. 4. The flow of fluid through the chamber 40 cools the plunger 14.

Referring to FIG. 4, the mold 16 includes a cylindrical housing 70 extending radially about the first longitudinal axis A. The housing 70 includes a top portion 72 having a top surface 74 and a bottom portion 76. The housing 70 includes an inner surface 78 and an outer surface 80 extending between the top and bottom portions 72 and 76. The inner surface 78 includes a glassware forming recess or portion 82. The outer surface 80 includes a fluid recess 84. The supply of fluid S is in fluid communication with the fluid recess 84 through fluid line 22 as shown in FIG. 1.

As shown in FIG. 4, the housing 70 includes a plurality of fluid channels 86 that extend radially about the first longitudinal axis A adjacent to and spaced from the glassware forming portion 82 of the housing 70. Each of the fluid channels 86 extends from a recess end 88 that is open to the fluid recess 84 and a top surface end 90 that is open to the top surface 74 of the housing 70.

Still referring to FIG. 4, each fluid channel 86 includes a recess section 92 that extends longitudinally from the recess end 88 along a second longitudinal axis B that is parallel to the first longitudinal axis A. Each fluid channel 86 further includes a top surface section 94 that extends longitudinally from the recess section 92 to the top surface end 90 along a third longitudinal axis C that is positioned at a predetermined angle X with respect to the second longitudinal axis B. The predetermined angle X can be in the range from about 35° to about 55°, with 45° being preferred.

During operation of the glassware machine 12, fluid such as air, from the supply of fluid S flows from the fluid recess 84 into the recess sections 92 of the fluid channels 86 through the recess ends 88 in the direction indicated by arrow 96 in FIG. 4. The fluid then flows through the top surface sections 94 and is discharged through the top surface ends 90 in the direction indicated by arrow 98 in FIG. 4. As it will be appreciated, the fluid is discharged away from the plunger 14 due to the above-described positioning of the top surface sections 94 with respect to the recess sections 92. The flow of fluid through the fluid channels 86 cools the mold 16.

Figure 4A:
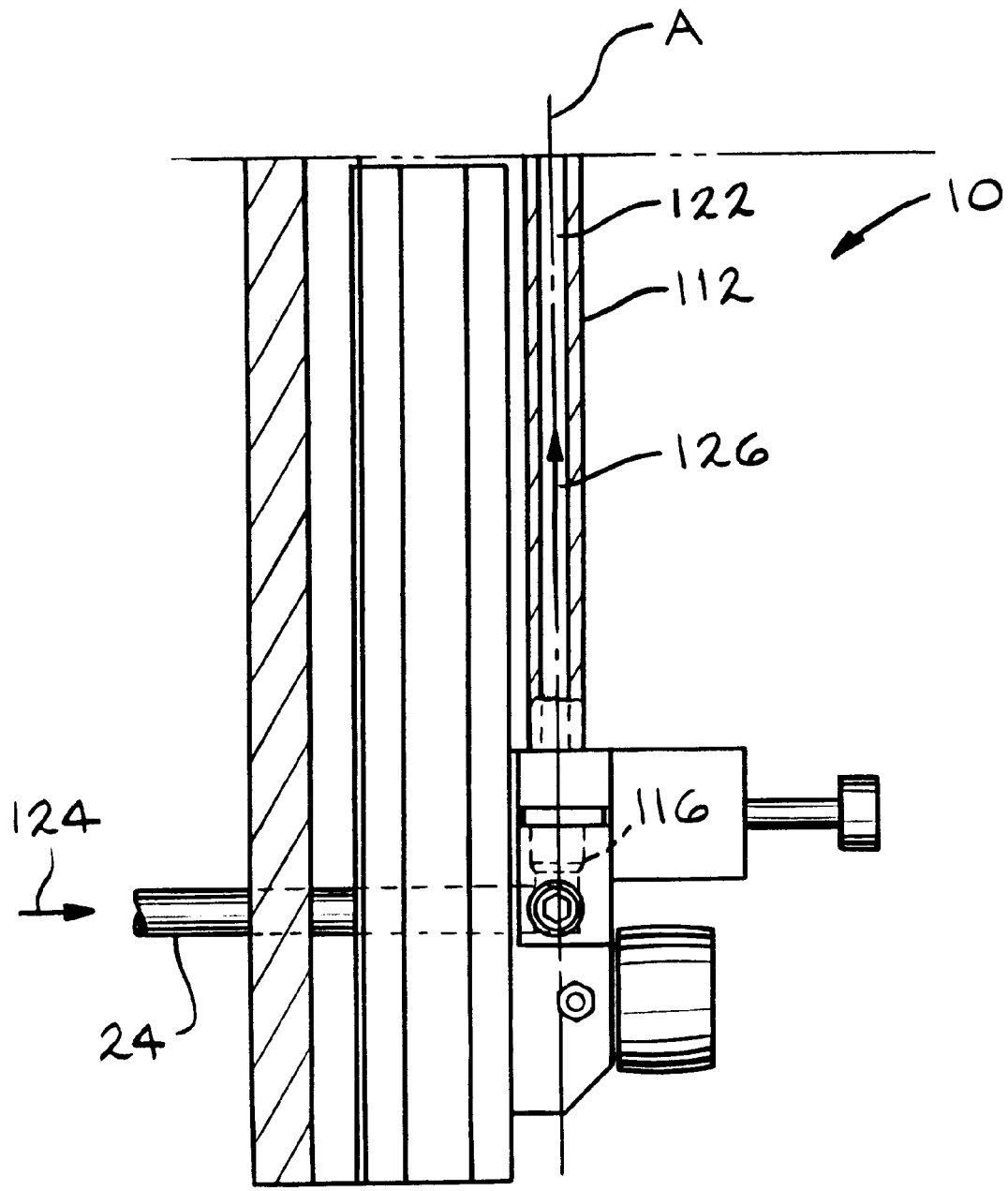
FIG. 4A is a continuation of FIG. 4.

Referring now to FIGS. 4 and 4A, the valve 18 includes a cylindrical body 100 that extends longitudinally and radially about the first longitudinal axis A. The body 100 further includes a closed top end 102 and an open bottom end 104. The body 100 includes an exterior surface 106 and an interior surface 108 that extend between the top and bottom ends 102 and 104. The interior surface 108 forms a valve recess or chamber 110.

Still referring to FIGS. 4 and 4A, the valve 100 includes a cylindrical valve cooling tube 112 positioned in the valve chamber 110. The valve cooling tube 112 has a first end 114 positioned adjacent to the top end 102 of the body 100 and a second end 116 (FIG. 4A). As shown in FIG. 4A, the second end 116 is in fluid communication with the supply of fluid S through fluid line 24. As shown in FIG. 4, the valve cooling tube 112 has an inside surface 118 and an outside surface 120 extending between the first and second ends 114 and 116. The inside surface 118 forms a continuous fluid passage 122. The outside surface 120 of the valve cooling tube 112 is positioned adjacent to and spaced from the interior surface 108 of the body 100.

During operation of the glassware machine 12, fluid such as air from the supply of fluid S flows through line 24 in the direction indicated by arrow 124 in FIG. 4A. The fluid then flows through the second end 116 of the valve cooling tube 112 into the fluid passage 122 in the direction indicated by arrow 126 in FIG. 4A. The fluid continues to flow through the fluid passage 122 until it is discharged through the first end 114 of the valve cooling tube 112 in the direction indicated by arrow 128 in FIG. 4. The fluid then flows in a downward direction in the space between the outside surface 120 of the valve cooling tube 112 and the interior surface 108 of the body 100. The fluid is then discharged through an opening 130 defined by the valve body 100 in the direction indicated by arrow 132 in FIG. 4. The flow of fluid in the valve chamber 110 cools the valve 18.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A cooling system for a glassware machine comprising:
    a glassware machine having a plunger having a longitudinal axis, a mold having a longitudinal axis and a valve having a longitudinal axis;
    a supply of fluid; said mold positioned between said plunger and said valve such that said longitudinal axis of said plunger, said valve, and said mold are each longitudinally aligned with one another
    said plunger including a chamber in communication with said supply of fluid, said plunger including a plunger cooling tube positioned in said chamber, said plunger cooling tube defining a plurality of spaced grooves for guiding fluid in said chamber to cool said plunger;
    said mold including a fluid recess in communication with said supply of fluid, said mold defining a plurality of fluid channels in communication with said recess for guiding fluid in said mold to cool said mold; and
    said valve including a valve chamber in communication with said supply of fluid, said valve including a valve cooling tube positioned in said valve chamber for guiding fluid in said valve chamber to cool said valve.

2. The system of claim 1, wherein said plunger includes a generally cylindrical casing extending radially about a longitudinal axis, said casing including an open end and a closed end, said casing including an inside surface and an outside surface extending between said open and closed ends, said inside surface including said chamber.

3. The system of claim 2, wherein said plunger cooling tube includes a generally cylindrical wall extending radially about said longitudinal axis, said cylindrical wall including an interior surface and an exterior surface positioned adjacent to said inside surface of said casing, said plunger cooling tube including an entrance end positioned adjacent to said open end of said casing and an exit end positioned adjacent to said closed end of said casing, said entrance end being in communication with said supply of fluid, said interior surface including a continuous fluid passage to permit flow of fluid between said entrance end and said exit end, said exterior surface including said plurality of spaced grooves to permit flow of fluid along said inside surface of said casing to cool said plunger.

4. The system of claim 3, wherein said plurality of spaced grooves extends radially about said longitudinal axis.

5. The system of claim 1, wherein said mold includes a generally cylindrical housing extending radially about a first longitudinal axis, said housing including a top portion having a top surface and a bottom portion, said housing including an inner surface and an outer surface extending between said top and bottom portions, said inner surface including a glassware forming portion, said outer surface including said fluid recess, each said fluid channel having a recess end and a top surface end extending from said fluid recess to said top surface to permit flow of fluid between said fluid recess and said top surface to cool said mold adjacent to said glassware forming portion.

6. The system of claim 5, wherein each said fluid channel includes a recess section longitudinally extending from said recess end along a second longitudinal axis being positioned substantially parallel to said first longitudinal axis, each said fluid channel further including a top surface section longitudinally extending from said recess section to said top surface end along a third longitudinal axis being positioned at a predetermined angle with respect to said second longitudinal axis.

7. The system of claim 6, wherein said predetermined angle is in the range from about 35° to about 55°.

8. The system of claim 5, wherein said plurality of spaced fluid channels extends radially about said first longitudinal axis.

9. The system of claim 1, wherein said valve includes a generally cylindrical body extending radially about a longitudinal axis, said body including a closed top end and a bottom end, said body including an exterior surface and an interior surface extending between said top and bottom ends, said interior surface including said valve chamber.

10. The system of claim 9, wherein said valve cooling tube is generally cylindrical and includes a first end positioned adjacent to said top end of said body and a second end, said second end being in communication with said supply of fluid, said valve cooling tube having an inside surface and an outside surface extending between said first and second ends, said inside surface including a continuous fluid passage to permit flow of fluid between said second end and said first end to cool said top end, said outside surface of said valve cooling tube being spaced from said interior surface of said body to permit flow of fluid between said respective surfaces.

* * * * *

UNITED STATES PATENT AND TRADEMARK OFFICE
CERTIFICATE OF CORRECTION

PATENT NO.   : 6,038,889
DATED        : March 21, 2000
INVENTOR(S)  : Terry E. Hartman et al.

It is certified that error appears in the above-identified patent and that said Letters Patent is hereby corrected as shown below:

Column 3,
Line 47, after "plunger having a", insert -- plunger --.
Line 48, after "mold having a", insert -- mold --.
Line 49, after "valve having a", insert -- valve --.
Line 49, after "axis", insert -- , said mold being positioned between said plunger and said valve such that said plunger, mold and value longitudinal axes are longitudinally aligned with one another --.
Line 50, after "fluid;", delete [said mold positioned between said plunger and said valve such that said longitudinal axis of said plunger, said valve, and said mold are each longitudinally aligned with one another].

Column 4,
Line 2, after "about", delete [a] and insert -- said plunger --.
Line 9, after "about said", insert -- plunger --.
Line 22, after "about said", insert -- plunger --.
Line 24, after "radially about", delete [a first].
Line 25, before "longitudinal axis,", insert -- said mold --
Line 37, after "second", insert -- mold --.
Line 38, after "parallel to said", delete [first] and insert -- mold --.

UNITED STATES PATENT AND TRADEMARK OFFICE
CERTIFICATE OF CORRECTION

PATENT NO. : 6,038,889
DATED : March 21, 2000
INVENTOR(S) : Terry E. Hartman et al.

It is certified that error appears in the above-identified patent and that said Letters Patent is hereby corrected as shown below:

Line 41, after "third" insert -- mold --.
Line 42, after "second", insert -- mold --.
Line 47, after "about said", delete [first] and insert -- mold --.
Line 50, after "about", delete [a] and insert --said valve --.

Signed and Sealed this

Seventh Day of August, 2001

*Attest:*

*Attesting Officer*

NICHOLAS P. GODICI
*Acting Director of the United States Patent and Trademark Office*